Oct. 7, 1924.　　　　　A. H. BRIGHAM　　　　1,510,827
NAIL MAKING MACHINE
Filed Aug. 12, 1921　　　3 Sheets-Sheet 1
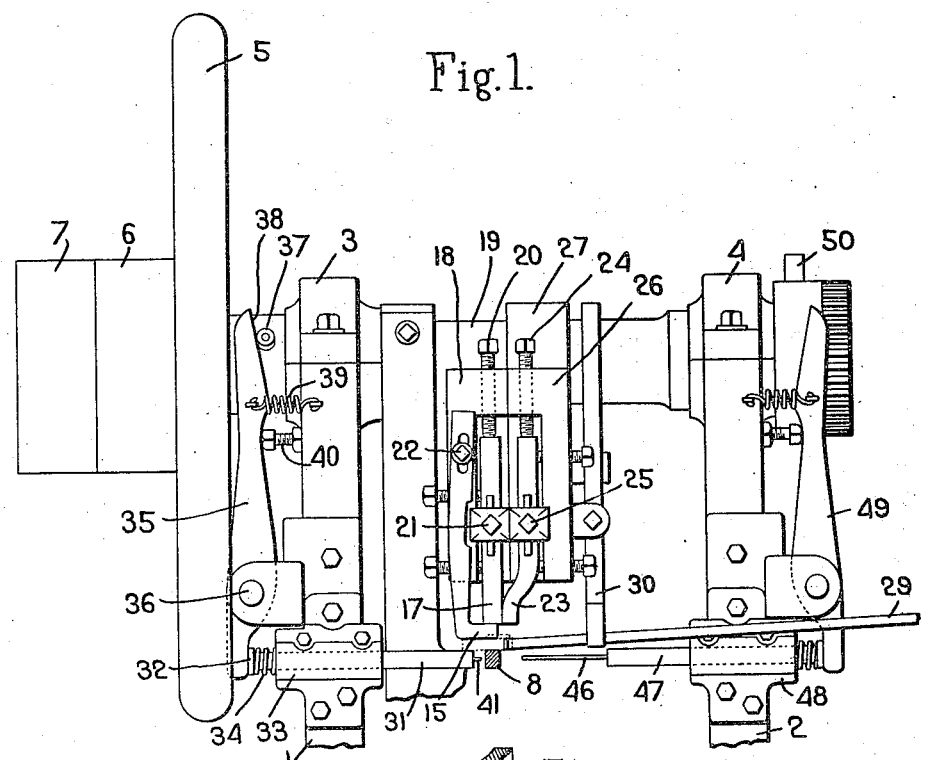
Fig.1.
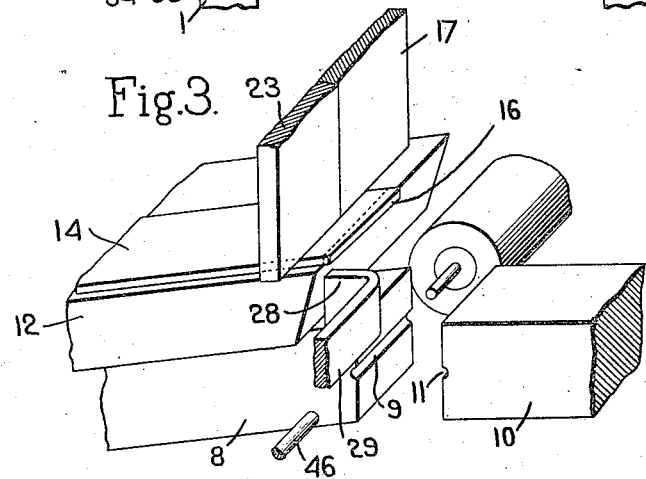
Fig.2.
Fig.3.
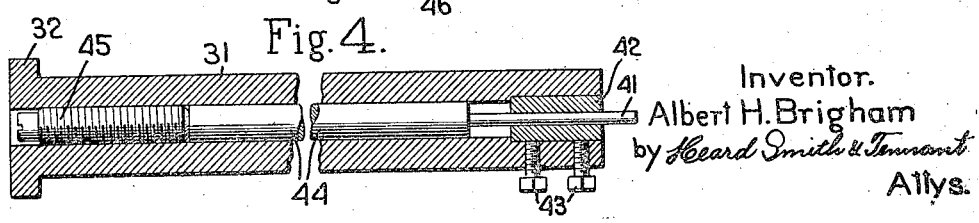
Fig.4.
Inventor.
Albert H. Brigham
by Heard Smith & Tennant
Attys.

Inventor.
Albert H. Brigham
by Heard Smith & Tennant.
Attys.

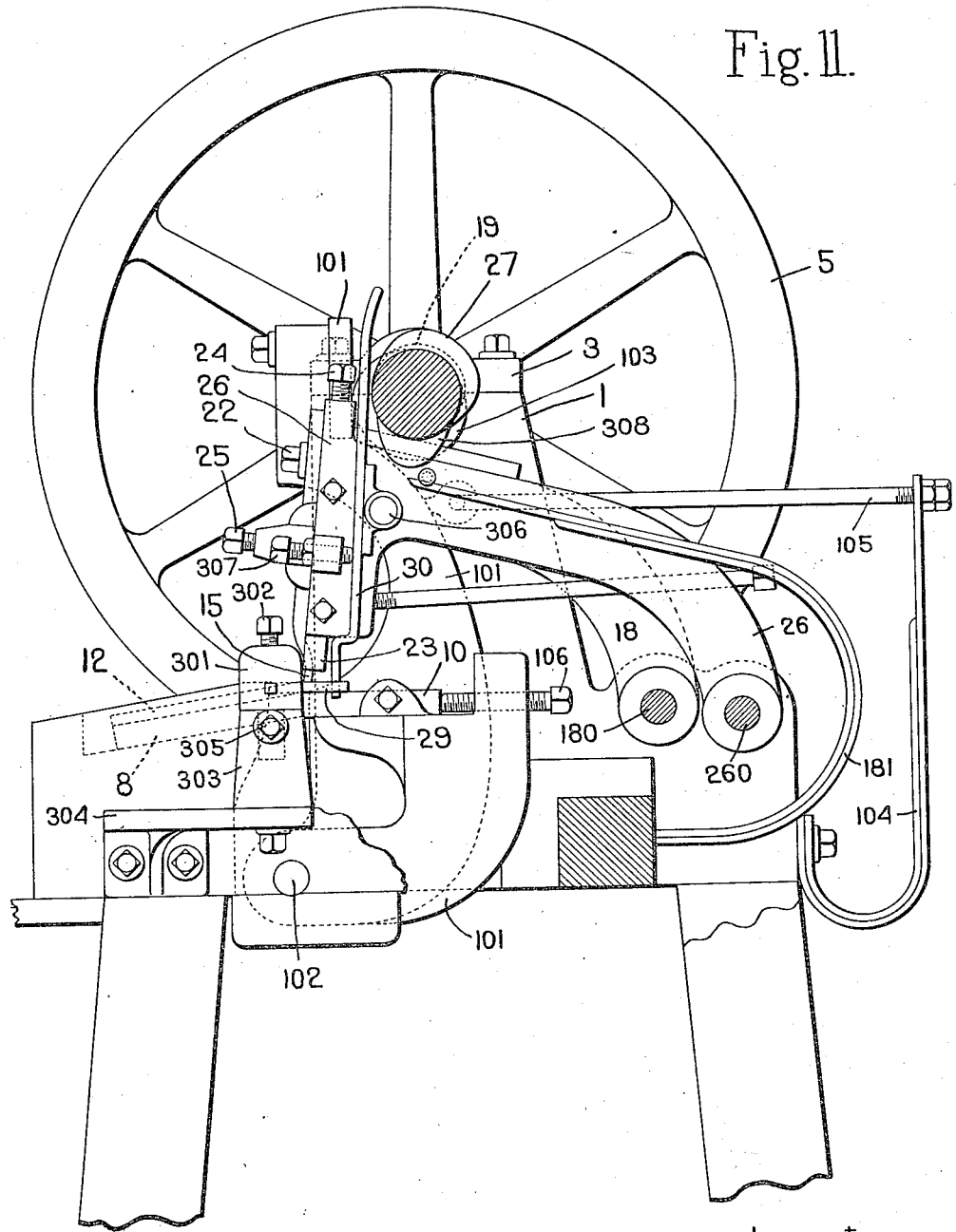

Patented Oct. 7, 1924.

1,510,827

UNITED STATES PATENT OFFICE.

ALBERT H. BRIGHAM, OF WHITMAN, MASSACHUSETTS.

NAIL-MAKING MACHINE.

Application filed August 12, 1921. Serial No. 491,649.

*To all whom it may concern:*

Be it known that I, ALBERT H. BRIGHAM, a citizen of the United States, and resident of Whitman, county of Plymouth, State of Massachusetts, have invented an Improvement in Nail-Making Machines, of which the following description, in connection with the accompanying drawing, is a specification, like characters on the drawing representing like parts.

This invention relates to a machine for making nails, particularly of the type such as used in boots and shoes, wherein the nail blanks are successively cut from a strip of sheet metal and are then formed into the required shape by means of dies.

The object of the invention is to provide a machine of this character in which the nail formed shall be of the so called "headless" type, or in which the head portion shall be of compacted form not materially larger than the shank.

The object of the invention more particularly is to provide such a machine in which the head portion of the nail shall be formed entirely within the nail blank receiving recess of the dies.

The object of the invention is further to provide such a machine of simple and rigid construction, compact in form, and capable of producing the nails automatically in rapid succession.

These and other objects and features of the invention will appear more fully from the accompanying description and drawings and will be particularly pointed out in the claims.

The drawings illustrate a machine which in its general features is of a type familiar to those skilled in the nail making art, so that it is only necessary to illustrate and describe in detail those features particularly involved in the present invention.

In the drawings:

Fig. 1 is a front elevation of the upper portion of a machine embodying the invention with the mechanism for feeding the stock strip removed, with the fixed cutter blade shown in dotted lines, and with the fixed die shown in vertical cross section.

Fig. 2 is a perspective view of a nail such as made by the machine in carrying out a preferred form of the invention.

Fig. 3 is a view in perspective looking from the rear and right hand side of Fig. 1 showing the principal elements of the machine.

Fig. 4 is a view in transverse section of the header element, the central section thereof being broken away.

Fig. 11 is a right hand side elevation partially broken away and partially in vertical section of the machine shown in Fig. 1.

Figure 5:
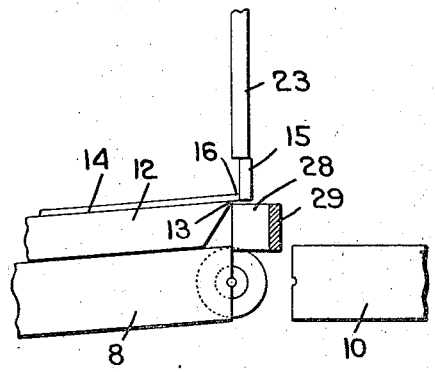
Fig. 5 is a view in side elevation looking from the right of Fig. 1 and partially in vertical cross section showing the main elements of the machine.

The machine in general comprises a suitable supporting frame having standards 1 and 2 and carrying at the top the transverse main shaft mounted in the bearings 3 and 4. This main shaft carries the fly wheel 5 and is driven from any suitable source of power by means of the fast and loose pulleys 6 and 7.

Near the center of the machine are mounted a pair of dies relatively movable toward and from each other and each provided in its face with a groove, the two grooves co-acting when the dies are in closed position to form a nail blank receiving recess. As usually constructed, these dies extend from the front to the rear of the machine so that the nail blank receiving recess extends transversely of the machine and the front die 8 with its groove 9 is usually a fixed die, while the rear die 10 with its groove 11 is usually a movable die.

Above the fixed die 8 is mounted a fixed or rigid cutter blade 12 having the cutting edge 13. The stock strip 14 of sheet metal rests upon the top of the fixed cutter blade 12. This stock strip 14 in the form illustrated is in width equal to the length of the nail blank and its thickness corresponds about to the required diameter of the nail blank. The stock strip is fed forward over the fixed cutter blade 12 by a familiar mechanism which forms no part itself of the present invention. The forward extent of the feed of the stock strip is limited by a gage 15, so positioned that when the stock strip abuts this gage, a portion of the strip corresponding to the required size of the nail blank will project rearwardly over the cutting edge 13. This portion seen at 16 in Fig. 3 is usually somewhat wedge shape, and consequently in order to preserve this wedge shape the stock strip 14 is reversed after each feeding operation so as to bring the head end of the nail blank alternately at opposite edges of the stock strip.

The movable cutter blade which co-operates with the fixed cutter blade is formed in two independent sections, these sections moving together during the cutting of the nail blank section from the stock strip and then having an independent movement as will hereinafter appear. One section 17 of the movable cutter blade is shown as mounted in a frame 18 having a generally vertical movement from a cam 19 on the main shaft. This section 17 is vertically adjusted in the frame 18 by means of a set screw 20 and is locked in place by a locking screw 21. This frame 18 also carries the gage 15, the upper end or shank of the gage being adjustably mounted on the frame by means of the set screw 22. The lower end of the gage 15 extends directly beneath and usually in contact with the lower end of the cutter blade section 17 but somewhat in the rear of the cutting edge. The second section 23 of the cutter blade is also adjustably mounted by means of the set screw 24 and the locking set screw 25 in a companion frame 26 operated by the cam 27 on the main shaft. The frames 18 and 26 extend rearwardly in the form of heavy curved arms which are pivoted to the main supporting frame at 180 and 260 respectively so that the cutter blade sections move in a flat arc substantially vertically. Heavy leaf springs 181 hold the frames up against the operating cams 19 and 27.

Figure 8:
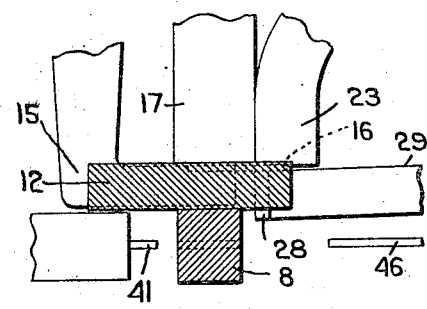
Fig. 8 is a view similar to Fig. 6 showing the elements in the position illustrated in Fig. 7.
Figure 10:
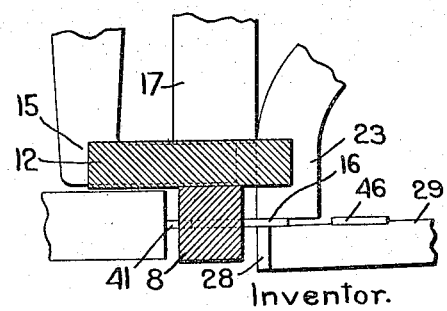
Fig. 10 is a view similar to Fig. 6 showing the elements in the position illustrated in Fig. 9.

The sections 17 and 23 of the movable cutter blade move together in cutting the nail blank section 16 from the stock strip 14 and at this time the stock strip is so supported that the dividing line between the cutter sections 17 and 23 is at that side of the fixed die toward the point end of the nail blank and the stock strip is so positioned that the head end of the nail blank is well inward of the corresponding end of the nail blank receiving recess in the dies. This will be seen from Figs. 6, 8 and 10 wherein the head end of the nail blank section 16 is at the left. It will be noted that this head end is well to the right of the plane of the left hand side of the die 8, while the point end projects well beyond the plane of the right hand side of the die 8 and the line of division between the cutter sections 17 and 23 is also well to the right of the plane of the right hand side of the die 8.

Means are provided for transferring the nail blank section from the position where it is severed from the stock strip to a position opposite the recess in the dies, and in the preferred form of the invention this means comprises the section 23 of the movable cutter blade co-operating with a yielding support 28. This yielding support extends beneath the point end of the nail blank section and beneath the movable cutter blade 23. It is bent from the end of a long flexible shank 29 suitably mounted at the extreme right of the machine and guided in a vertical pivoted guide 30. The shank 29 is shown as extending through an aperture in a block 301 and locked therein by a set screw 302. The block has a stud mounted and rotarily adjustable in a standard 303 on a bracket 304. The stud is locked in place by a set screw 305 and the bracket extends out from and is secured to a suitable portion of the main supporting frame. The long flexible shank 29 being thus mounted will swing to its uppermost position and will yield downwardly under the action of the cutter blade section 23. The guide 30 is pivoted at 306 on the frame 36 and is limited in its forward movement by the adjustable set screw 307. It is swung rearwardly at the required times by the wiper cam 308 on the main shaft.

Figure 6:
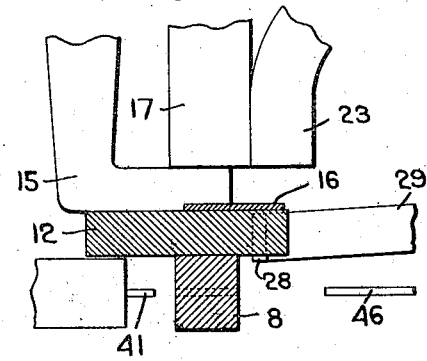
Fig. 6 is a view in front elevation and partially in vertical cross section of the elements in the position shown in Fig. 5.
Figure 7:
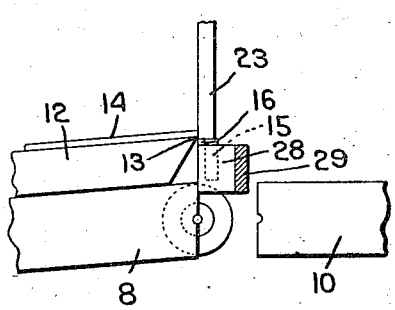
Fig. 7 is a view similar to Fig. 5 but showing the elements in the position just after the nail blank has been cut from the stock strip.
Figure 9:
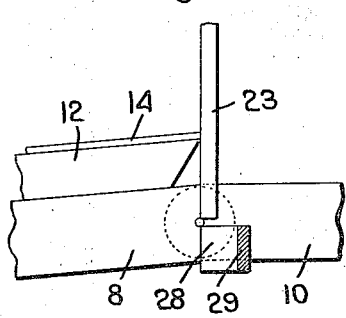
Fig. 9 is a view similar to Fig. 5 showing the elements in the position when the dies have closed upon the nail blank and the header has moved into the nail blank receiving recess.

The operation of the machine starts with the parts in the position shown in Figs. 5 and 6. The stock strip 14 is fed over the fixed cutter blade 12 toward the rear of the machine until it abuts against the gage 15, thus leaving the nail blank section 16 projecting rearwardly over the cutting edge 13. The movable cutter blade sections 17 and 23 now move downwardly carrying with them the gage 15 until these cutter blade sections together sever the nail blank sections 16 from the strip. As this severance takes place the nail blank section is carried against the top of the yielding support 28 and its point end is clamped between the yielding support and the section 23 of the movable cutter blade. The parts are then in the position shown in Figs. 7 and 8. The cutter blade section 17 and the gage 15 now move upwardly, but the cutter blade section 23, clamping the nail blank section 16 against the yielding support 28, continues to move downwardly until it brings the nail blank opposite the recess 9 in the fixed die, or into the position shown in Figs. 9 and 10. But at this time the movable die has not closed. The nail blank is thus transferred to a position opposite the recess with the dies in open position and with the head end of the blank inward of the corresponding end of the recess and with the point end clamped between the section 23 and the yielding support 28 extended outward from the opposite end of the recess. The nail blank is retained in this position until the dies are closed. The movable die 10 now closes upon the fixed die, clamping the nail blank firmly in the nail blank receiving recess.

This movable die 10 is supported on a rocker frame 101 pivoted at 102 on the main supporting frame and having its upper end in front of the main shaft. This rocker frame is swung to move the die forwardly by the cam 103 and rearwardly by the heavy leaf spring 104 connected to the rocker frame by the link 105. A set screw 106 abutting the die 10 in the rocker frame enables it to be adjusted therein.

Means are provided for heading or compressing and expanding the head end of the nail blank in the recess of the dies. For this purpose a header, shown in detail in Fig. 4, is provided. This header comprises a sleeve 31 having an annular shoulder 32. This sleeve is mounted in a bearing 33 on the standard 1, so as to reciprocate axially in line with the nail blank receiving recess of the dies. It is normally projected away from the dies by means of a helical spring 34 mounted between the bearing 33 and the shoulder 32. It is projected toward the dies by a powerful lever 35 fulcrumed at 36 on the frame and operated by a roller 37 on the main shaft engaging a cam face 38 on the lever. The lever 35 is held toward the roller 37 by a spring 39 and its movement is limited by an adjustable stop 40. In the header sleeve 31 is mounted a header pin 41 centered and rigidly locked in place by a split holder 42. The holder 42 is locked in place in the sleeve or carrier 31 and clamps the header pin 41 by means of the set screws 43. The header pin abuts a shank 44, which in turn abuts a screw 45 threaded in the sleeve or carrier 31. Thus the header pin can be accurately adjusted as to the amount of its projection beyond the sleeve 31 by loosening up the set screws 43 and adjusting the screw 45.

After the dies have closed upon the nail blank, the operation of the machine causes the sleeve or carrier 31 to move inwardly forcing the header pin 41 axially against the head end of the nail blank, and thus compressing or expanding the head end in the recess to give it the required finished form, as shown in Fig. 2.

The dies then open and the elements return to starting position, as shown in Figs. 5 and 6. Sometimes, owing to the great power exerted, the nail is held in the groove 9 of the fixed die, and it is, therefore, desirable to provide means for clearing it from this groove. For this purpose a clearer is provided, shown as a pin 46 mounted in a sleeve 47 sliding in a bearing 48 on the standard 2 axially in line with the recess. The sleeve 47 is operated in a similar manner to the sleeve 31 by means of the lever 49 and roller 50 on the main shaft, and the parts are so timed that this clearer moves in and knocks the nail out of the groove 9 when the dies open.

The operation of the machine proceeds automatically forming the nails in rapid succession. It is possible to form the "headless" type of nail in an efficient, practical and economical manner.

Having thus described my invention, what I claim as new and desire to secure by Letters Patent, is:

1. A nail making machine comprising a pair of dies relatively movable toward and from each other and each provided in its face with a groove, the two grooves coacting when the dies are in closed position to form a nail blank receiving recess, means for severing from a stock strip a nail blank and for transferring the blank to, and for supporting the blank in, a position opposite the recess of one of the dies when the dies are in open position with the head end of the blank inward of the corresponding end of the recess and with the point end of the blank extended outward from the opposite end of the recess, and means for closing the dies upon the blank to clamp the blank in the recess with its head end inward thereof and its point end extended outward therefrom.

2. A nail making machine comprising the construction defined in claim 1, together with a header movable axially of the recess when the dies are in closed position, and means for projecting it into the recess against the head end of the clamped nail blank to compress and expand the said head end in the recess.

3. A nail making machine comprising the construction defined in claim 1, together with a header movable axially of the recess when the dies are in closed position, means for projecting it into the recess against the head end of the clamped nail blank to compress and expand the said head end in the recess, a clearer, and means for projecting the clearer against the extending point end of the nail to clear it from the dies upon their separation.

4. A nail making machine comprising a fixed die provided on its face with a groove, a movable die provided on its face with a groove, the said movable die being movable toward and from the fixed die, the grooves when the dies are in closed position co-acting to form a nail blank receiving recess, a fixed cutter blade above the fixed die, means for feeding a stock strip to project a nail blank section over the edge of the fixed cutter blade with the head end of the nail blank inward of the corresponding side of the fixed die and with the point end extending outward from the opposite side of the fixed die, means co-operating with the fixed cutter blade for severing the said projecting nail blank section from the stock strip and for transferring it to, and for supporting the blank in, a position opposite the fixed die groove, means for closing the movable die upon the fixed die to clamp the nail blank with its head end inward with the corresponding end of the recess and its point end extended outward from the opposite end of the recess, a header movable axially of the recess, and means for projecting it into the recess against the head end of the clamped nail blank to compress and expand the said head end in the recess.

5. A nail making machine comprising the construction defined in claim 4, together with a clearer and means for projecting it against the extending point end of the nail to clear it from the dies upon their movement to open position.

6. A nail making machine comprising a fixed die provided on its face with a groove, a movable die provided on its face with a groove, the said movable die being movable toward and from the fixed die, the grooves when the dies are in closed position co-acting to form a nail blank receiving recess, a fixed cutter blade above the fixed die, means for feeding a stock strip to project a nail blank section over the edge of the fixed cutter blade with the head end of the nail blank inward of the corresponding side of the fixed die and with the point end extended outward from the opposite side of the fixed die, a movable cutter blade in two sections, means for moving the two sections of the cutter blade to sever in co-operation with the fixed cutter blade the said projecting nail blank section from the stock strip, a yielding support located beneath the extending point end of the nail blank, means for continuing the movement of one section of the movable cutter blade to clamp the point end of the nail blank between it and the yielding support and transfer the nail blank to a position opposite the fixed die groove, and means for closing the movable die upon the fixed die to clamp the nail blank with its head end inward with the corresponding end of the recess and its point end extended outward from the opposite end of the recess.

7. A nail making machine comprising the construction defined in claim 6, together with a header movable axially of the recess when the dies are in closed position, and means for projecting it into the recess against the head end of the clamped nail blank to compress and expand the said head end in the recess.

In testimony whereof, I have signed my name to this specification.

ALBERT H. BRIGHAM.